June 22, 1965 D. B. CONGLETON ETAL 3,190,551

DECIMAL PARITY DIGIT APPARATUS

Filed July 16, 1963 3 Sheets-Sheet 1

Inventors.
David B. Congleton
Sydney Glazer
Merton C. Leinberger

By: Louis A. Kline
John J. Matlago
Dominick Nardelli
Their Attorneys.

June 22, 1965 D. B. CONGLETON ETAL 3,190,551

DECIMAL PARITY DIGIT APPARATUS

Filed July 16, 1963 3 Sheets-Sheet 2

Inventors.
David B. Congleton
Sydney Glazer
Merton C. Leinberger

By: Louis A. Kline
John J. Matlago
Dominick Nardelli
Their Attorneys.

DECIMAL PARITY DIGIT APPARATUS
Filed July 16, 1963 3 Sheets-Sheet 3
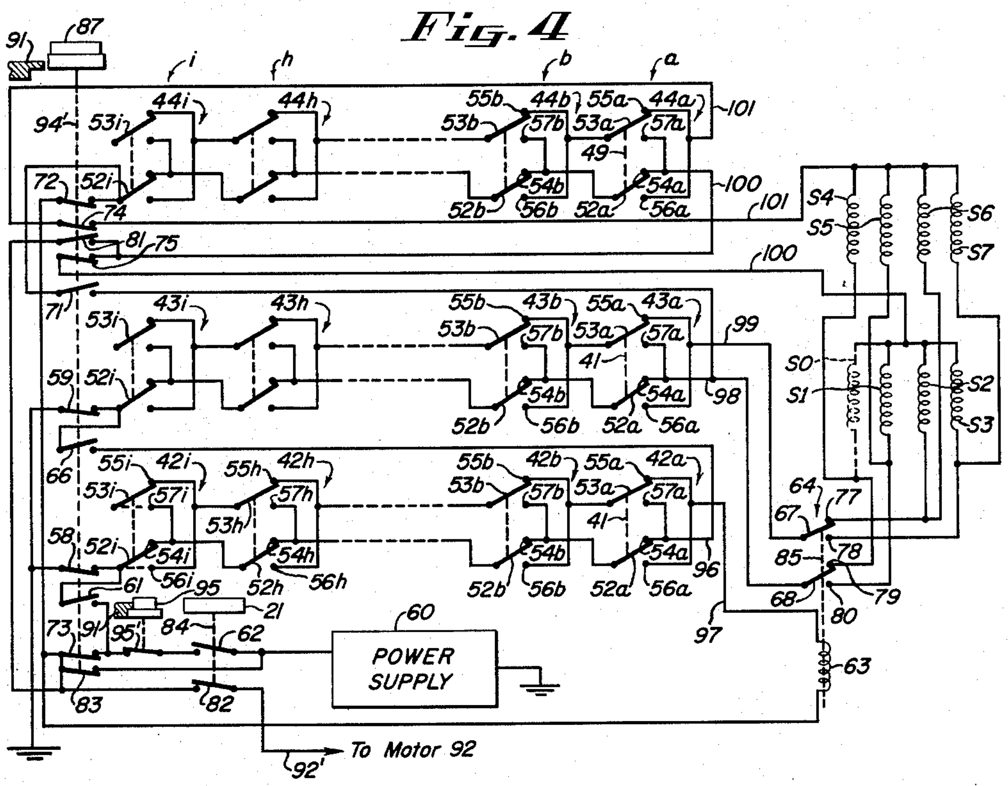
Fig. 4
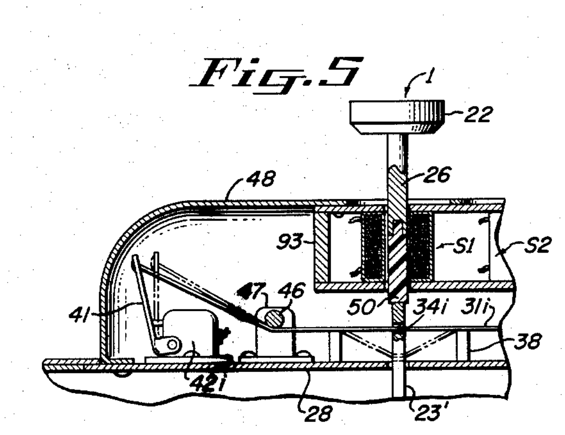
Fig. 5
Fig. 6
| KEY | OPENING | | |
|---|---|---|---|
| | 36a | 35a | 34a |
| | SWITCH | | |
| | 44a | 43a | 42a |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |
| 8 | 0 | 0 | 1 |
| 9 | 1 | 1 | 0 |
Inventors.
David B. Congleton
Sydney Glazer
Merton C. Leinberger
By: Louis A. Kline
John J. Matlago
Dominick Nardelli
Their Attorneys.

United States Patent Office 3,190,551

Patented June 22, 1965

3,190,551

DECIMAL PARITY DIGIT APPARATUS

David B. Congleton, Torrance, Sydney Glazer, Los Angeles, and Merton C. Leinberger, Inglewood, Calif., assignors to The National Cash Register Company, Dayton, Ohio, a corporation of Maryland Filed July 16, 1963, Ser. No. 295,467

7 Claims. (Cl. 235—61)

This invention relates to error protection devices and systems for calculating machines, and, more particularly, to such devices and systems, that are readily adaptable to full keyboard calculating machines of the prior art.

It is well understood in the art that a full keyboard calculating machine, such as an adding machine, a cash register, etc., can, in response to the depressing of a motor bar, print a number set up on the keyboard of the machine onto a paper tape that is provided as part of the read-out equipment for the machine. In many business systems where such machines are used as points of origin for data, i.e., are employed for providing data to be ultimately fed into high speed electronic data processors, it is highly desirable to associate a parity digit with the number being entered in the keyboard. By this means the number printed with stylized characters on the tape can be checked for accuracy when it is read in a well known manner by direct character recognition devices, for example, into the memory of the data processor, or subsequently transferred from one storage medium into another of the data processor.

In such systems, the parity digit associated with the number, as determined by some prescribed arbitrary rule, can be initially obtained by the operator from a table or a parity digit generator unit and then manually inserted on the keyboard of the calculator by the operator at the same time the operator sets up the number on the keyboard. However, it is highly desirable to be able to provide a simple, inexpensive, parity digit generator device and system which is readily adaptable to being built into and being made a part of a full keyboard calculator. It is then possible to automatically generate and set up a parity digit for a number on the keyboard of the calculating machine at the same time the number is being manually set up therein so that in response to the depression of the motor bar both the number and its associated parity digit can be printed at the same time on the tape. This feature is desirable because it eliminates the need of the operator to be concerned with obtaining the parity digit and also tends to minimize errors being made since the parity digit need not be manually placed on the keyboard.

It should be appreciated that, at times, a parity digit for a number may already be available to an operator and hence, under such circumstances, it is highly desirable to be able to modify the parity digit generator circuitry to function not as a generator but rather as a parity digit checker. The device of the present invention is particularly suitable for such an application since it is possible by a very simple modification to permit the operator to set up both the number and its associated parity digit onto a keyboard and then provide for the printing mechanism to become inoperable in response to the motor bar if the parity digit is not correct for that number.

Therefore, a principal object of this invention is to provide an improved simple economical apparatus which generates a parity digit for a number, and which is readily and economically adaptable to being built into and being made a part of a full keyboard calculating machine.

Another object of this invention is to provide a simplified electrical relay switching network for performing the logic needed for determining and setting up the parity digit to be associated with a particular number inserted on a full keyboard.

Another object of this invention is to provide a switching network for controlling the electric motor of a full keyboard calculating machine and for preventing the motor from actuating the printing mechanism when a number and a parity digit setup on the full keyboard do not check for parity.

By this invention, the novel mechanism for generating a decimal parity digit is combined with a standard full keyboard calculating machine so that the machine, when required, can still operate in the mode for which it was originally designed. The standard full keyboard calculating machine, in general, has a digit key for each digit in each decimal denominational order. The novel mechanism for each key column includes a group of three double pole, double throw electric switches and mechanical linkage means disposed to actuate a different combination of the three electric switches in the key column in accordance with which one of the digit keys is depressed. In the ensuing description, the switches of a group that are actuated when a given digit key is depressed are represented by a binary "1," and the switches that are not actuated are represented by a binary "0." Each of the three switches represents a binary denominational order of the binary number equivalent of the particular digit key depressed. As an example, when the digit key for decimal digit two is depressed in a key column, the three bit binary number equivalent 010 indicates that the switch representing the middle binary denominational order is the only switch that is actuated. In the embodiment of the present invention no digit key is provided for the decimal digit zero on the standard full keyboard machine, a significant zero being printed in a denominational order when no digit key therein is depressed. Therefore, the three bit binary number 000 (indicating that no switch is actuated) is reserved to denote the decimal digit zero. One switch of one group of three switches is series connected to one switch of another group, in conformance with a mathematical rule which in accordance with the present embodiment provides for all the binary digits in the same binary denominational order of all the three bit binary numbers to be summed or compared to determine whether an odd quantity of binary "1" bits or an even quantity of binary "1" bits is in the binary denominational order. After the three circuits of series connected switches compare each binary denominational order for either an odd or even quantity of binary "1" bits, and find that the quantity of binary "1" bits in a binary denominational order is odd, one of two leads at the end of each of the three circuits of series connected switches has applied thereto an electrical potential and is represented by the binary "1" bit. However, if the quantity of binary "1" bits in the binary denominational order is even, the other of the two leads has applied thereto the electrical potential and is represented by the binary "0" bit.

The novel mechanism also includes seven solenoids that are disposed to depress a particular digit key in a particular one of the key columns that is reserved for generating the parity digits. Power to energize the solenoids associated with respective keys of the parity digit key column is coupled through the switches forming the odd-even binary bit comparator and also through a logic circuit. Normally, in a standard full keyboard calculating machine, a number is printed when the motor bar is depressed, and the novel mechanism, preferably, includes an additional normally-open switch series connected between the power supply and solenoids which switch is closed when the motor bar is depressed. When the normally open switch is closed, current is conducted by the logic circuit to only one of the solenoids, in accordance with which ones of the six leads at one end of the three circuits of series connected switches have a potential applied thereto. A particular solenoid is thus energized causing a particular digit key, representing the parity decimal digit, to be depressed. The action of the solenoid being faster than the mechanical printing operation of the calculating machines, enables the parity decimal digit to be printed along with the digits of the number set upon the keyboard.

Other objects, features, and advantages of the invention will hereinafter be made apparent to those skilled in the art, in the following description of an exemplary system and embodiment of the apparatus made according to the invention, reference being made to the appended drawings forming a part of the description, in which drawings:

FIG. 4 is a schematic wiring diagram including the solenoids and the switches;

FIG. 5 is a partial vertical section showing, in particular, a solenoid-operated digit key in detail; and FIG. 6 is a binary truth table indicating the coding configuration for the three openings on each of the key stems corresponding to the manner in which the three switches in a column are actuated when a digit key is depressed.

The novel mechanism of this invention, in general, is incorporated in a full keyboard calculating machine, similar to that disclosed in U.S. Patent No. 2,665,063, wherein the keyboard and key stems only need be modified to incorporate the features of this invention, as will now be described.

*General description*

Figures 1, 2:
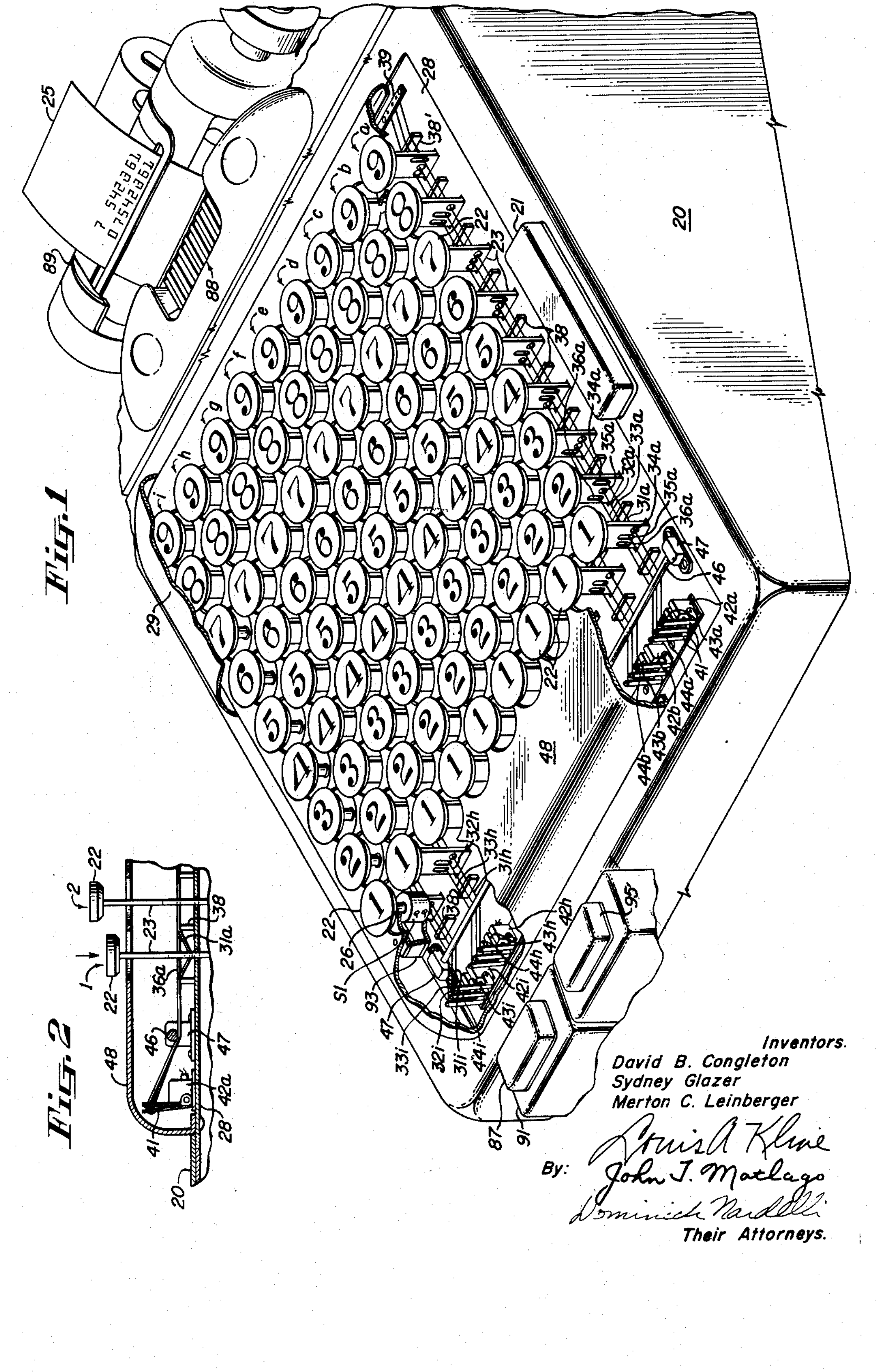
FIG. 1 is a pictorial view of the keyboard of a full keyboard entry printing device with portions of the top plate broken away showing one embodiment of the mechanism that generates the decimal parity digit.
FIG. 2 is a partial vertical section showing a portion of the digit keys in a typical key column and showing an elevation of one embodiment of the novel mechanism.

Referring to the drawings and to FIG. 1 in particular, a pictorial view of a typical calculating machine, that prints numbers and performs other operations, is shown. Herein, a calculating machine is defined as a mechanical or electrical device which prints characters or decimal digits on a paper tape. The machine may have other functions, but these other functions are immaterial to this invention. A full keyboard is defined as having, for example, nine columns of keys, a column for each decimal denominational order and each column having nine digit keys, numbered 1 to 9. In a full keyboard calculating machine, a digit key is provided for each digit in each decimal denominational order, and a multi-digit number usually is set up on the keyboard beginning with the decimal digit in the highest denominational order and continuing down to the digit in the least significant denominational order. If any significant denominational order contains a zero digit, significant zeros are also printed by the calculating machine, and do not have to be set up by keys. Therefore, in order to set up the multi-digit number 1,000,000, for example, only the "1" key of the million denominational order is depressed.

The calculating machine is housed in a casing 20 (partially shown) having an upper mounting plate 28 on which the elements of one embodiment of the invention are mounted. The mounting plate 28 and the full keyboard are preferably the removable type which can be readily removed from and replaced in the computing machine in a manner as disclosed in the prior art. The elements of the calculating machine are enclosed within casing 20 and some of the elements useful in understanding the present invention will be explained hereinafter.

The calculating machine, as shown, includes the full keyboard having nine key columns *a, b, c, d, e, f, g, h,* and *i* representing nine decimal denominational orders. Each key column has nine digit-representing keys 1 to 9 capped with plastic buttons 22 and projecting through a top plate 48 positioned over the mounting plate 28. For reasons that will be explained hereinafter, the digit keys 1 to 9 in key column *i* may be covered by a removable protective cover 29 shown partially broken away. After the number that is to be printed is set up on the keyboard, the calculating machine elements enclosed within casing 20 are set into the printing cycle by depressing a motor bar 21. A set of type bars 88, provided with preferably a stylized font, prints the number set up on the keyboard onto a paper tape 25 held in a paper carriage 89.

The calculating machine of the prior art, when converted to include the features of this invention, preferably also includes a check bar 87. The check bar 87 operates a bank of single pole, single throw switches that is housed in enclosure 91 and will be explained hereinafter. Since the calculating machines of the prior art are to be readily adaptable to the features of this invention, the enclosure 91 is, preferably, fixed onto the outside of the calculating machine casing 20. Also, the calculating machine may include a parity bar 95 that operates another switch (to be more fully explained hereinafter) which isolates the elements of the invention from the calculating machine when the machine is required to operate in the mode for which it was originally designed.

*Printing mechanism*

As in the calculating machines of the prior art, when the motor bar 21 is depressed, the motor starting switch 82 (which is a part of the machine of the prior art and shown schematically in FIG. 4) is actuated to start a motor 92 (FIG. 3) turning, and the calculating machine is driven through its printing cycle to print a number on tape 25.

Figure 3:
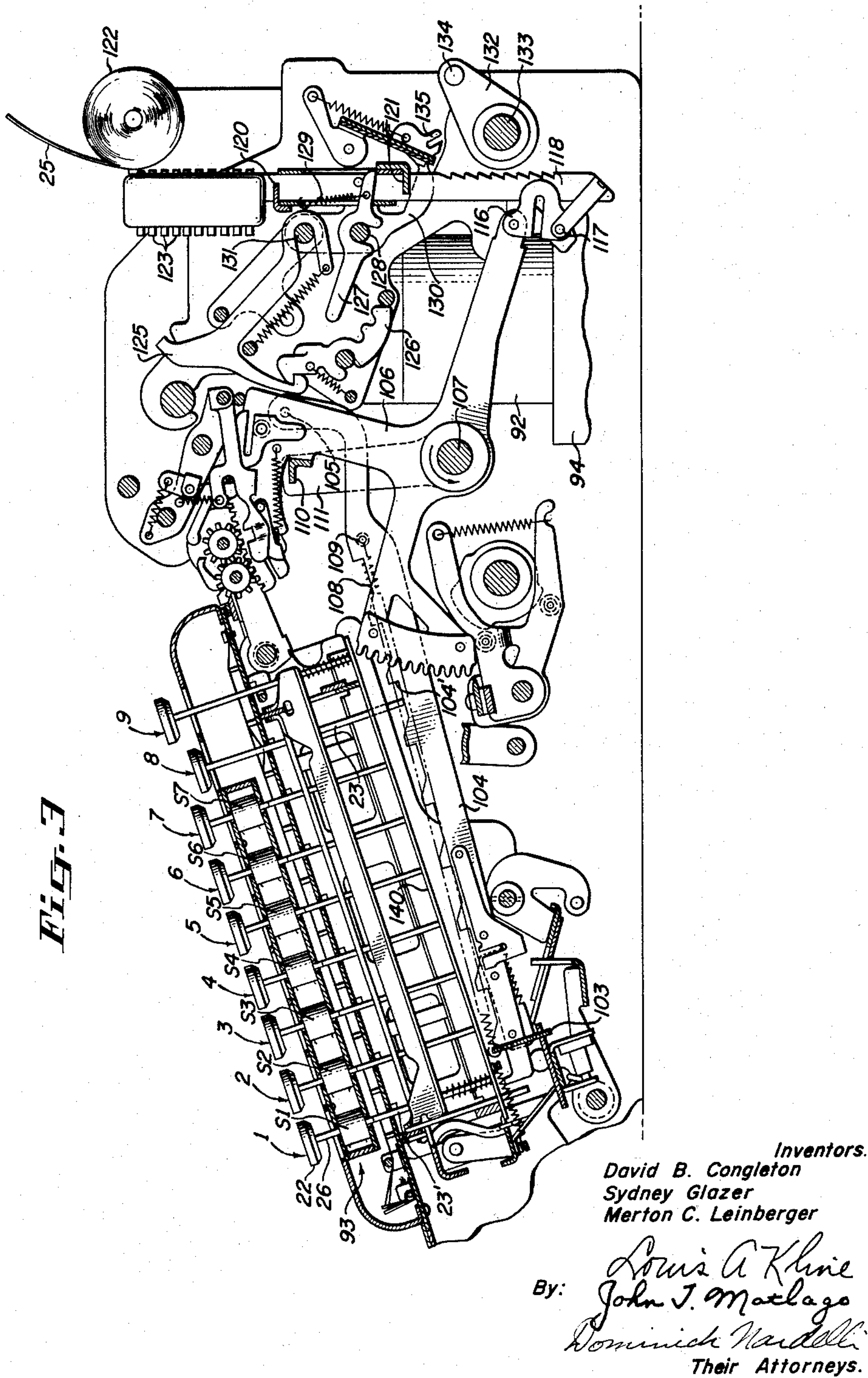
FIG. 3 is a vertical section showing, in particular, a solenoid-operated key column and a schematic of a standard printing mechanism that is duplicated for each denominational order.

Referring to FIG. 3, the printing mechanism of one denominational order of a typical calculating machine is shown. The description and operation of the printing elements are given herein for those who are not familiar with the calculating machine as described in the above-mentioned U.S. Patent No. 2,665,063.

In general, the number is set upon the full keyboard by depressing digit keys in appropriate columns of the keyboard and, as an example, the digit key 8 in the typical denominational order, shown in the drawing, is depressed as shown. After the motor bar 21 is depressed and, in turn, the switch 82 is closed, the motor 92 starts to rotate and, through suitable gearing 94 (schematically shown), causes a shaft 107 initially to rotate counter-clockwise in the direction of the arrow. The counter-clockwise rotation of shaft 107, in turn, causes an arm 111, fixed to one end of the shaft 107, and another arm, like arm 111, fixed to the other end of the shaft 107 to rotate counter-clockwise. A bail 110, that is fixed at its ends to both arms 111, is moved forward and downward by arms 111. The function of bail 110 is to retain a three-arm diverging lever 106 in the position as shown in the drawing, but when the bail 110 is moved forward and downward by arms 111, the lever 106 is free to rotate counter-clockwise about shaft 107 under the action of a spring 108 stretched between a stud 109 on a stop bar 104 and a comb 103. The action of the spring 108 is transferred to lever 106 as the end of stop bar 104 is pivotably mounted on a stud 105 fixed to the upward extending arm of lever 106. Under action of the spring 108, the stop bar 104 moves forward until, for example, the tooth 104', formed thereon, is stopped by the depressed key stem 23 of digit key 8. The three-arm lever 106 has a rearward extending arm that is pivoted to a link 116, that is, in turn, pivoted to a printer bar 118 by a stud 117. The counter-clockwise rotation of lever 106 causes the printer bar 118 to move up a predetermined amount in suitable slotted guides 120 and 121. The distance that the stop bar 104 moves forward determines the distance that the printer bar 118 moves up and, consequently, determines which one of the ten digit-type bars 123 is located at the printing position when a printing hammer 125 is released from the cocked position.

The printing hammer 125 is released when a cam lever 132 on a shaft 133 is rotated counter-clockwise during the printing cycle. The rotating action of shaft 133 is transferred to the hammer 125 by a stud 134 on cam lever 132 striking the tail 135 on an arm 130 causing the arm 130 to pivot clockwise on a shaft 131. A bail 128, that is fixed at one end to arm 130 and at the other to an arm like arm 130, moves forward with the arm 130. In turn, an interponent 127 (which has rotated counter-clockwise under the action of a spring 129 when the printing bar 118 moved up) also moves forward towards a latch 126 that is holding the hammer 125 in the cocked position. The interponent 127 on contacting the latch 126 causes the latch 126 to release the hammer 125 to print the digit (formed on the end of the particular type bar 123) on the paper 25 that is held by a paper platen 122. In the latter part of the printing cycle, shaft 107 and, in turn, arms 111 and the shaft 133, are rotated clockwise, and the printing mechanism is returned to the position as shown in FIG. 3.

Again, reference is made to the above-mentioned U.S. Patent No. 2,665,063 for a more detailed description of the construction and operation of the printing mechanism, the description given herewith being sufficient for an understanding of the present invention.

*The parity digit generator*

Referring to FIG. 1, the elements adapted to the keyboard to generate the parity digit, will now be described. The plastic buttons 22 of the digit keys and the features on the key stems are duplicated in all the key columns *a* through *i*. However, key column *i* includes additional features that are not common to key columns *a* through *h*. Therefore, only key column *a*, representative of key columns *a* through *h*, will now be described.

The digit keys in column *a* each have the plastic button 22 fixed to the end of a flat key stem 23, slidably mounted through slots formed in the mounting plate 28. The key stems 23 are arranged so that their broad flat side is normal to the column alignment, as shown. Each of the key stems 23 has formed therein, in the portion of the stem extending above plate 28, three openings 34*a*, 35*a*, and 36*a*, disposed side by side. The openings 34*a* are disposed near the motor bar 21, and through each opening 34*a* in all key stems 23 of one column is threaded a first thin flexible code line 31*a*; through each opening 35*a*, is threaded a second thin flexible code line 32*a*; and through each opening 36*a*, is threaded a third thin flexible code line 33*a*. The thin flexible code lines 31*a*, 32*a*, and 33*a* are made of, for example, a braided nylon line that has relatively little stretch and good abrasion characteristics. The codes lines 31*a*, 32*a*, and 33*a* rest on suitable bridges 38 mounted upon plate 28 and each bridge is disposed between two key stems 23. The rearwardly disposed end of each code line 31*a*, 32*a*, and 33*a* is suitably secured to the plate 28 with the aid of a securing bar 39, while the other ends of code lines 31*a*, 32*a*, and 33*a* are fixed to separate actuating levers 41 on switches 42*a*, 43*a*, and 44*a*, respectively. The switches 42*a*, 43*a*, and 44*a* are also mounted upon plate 28 with their respective actuating lever 41 disposed upwardly from the plate. As the free end of each lever 41 is spaced above the plate 28 at a greater distance than the upper edges of bridges 38 are spaced above the plate 28, a smooth round metallic bar 46 is provided, spaced from the plate 28, to deflect the lines upward. The bar 46 is secured at each end to the plate 28 by blocks 47. Thus, the code lines 31*a*, 32*a*, and 33*a* are normally disposed substantially parallel to plate 28 between the bridge 38′ on the rearward side of digit key 9 and the round bar 46, where the lines deflect upward to engage the actuating levers 41.

As shown in FIG. 1, the openings 34*a*, 35*a*, and 36*a* in the flat key stems 23 are formed into either of two distinct shapes, described as circular or vertically elongated. The shape of each opening is made in accordance with the binary truth table of FIG. 6. The occurrence of a binary "1" in the coded binary number, as given in the truth table, indicates that the opening having the item number (located at the top of the truth table) and located on the digit key (as indicated on the left of the truth table) has a circular shape. The occurrence of a binary "0" in the table indicates that the opening on the digit key has an elongated shape. As an example, the digit key 2 has a binary code 010, indicating that the key stem 23 for the key has one circular opening 35*a* disposed between two elongated openings 34*a* and 36*a*. The digit key 7 has a binary code 111, indicating that the key stem 23 for the key has three circular openings 34*a*, 35*a*, and 36*a*. Since only eight different combinations can be made from three bit binary numbers, in this particular embodiment of the invention the binary code for keys 8 and 9 are the same as the code for keys 1 and 6, respectively, for reasons that will be explained hereinafter.

Since, as indicated in the truth table, at least one of openings 34*a*, 35*a*, or 36*a* in each of the key stems 23 is circular, a lever 41 on at least one switch of the group of three switches 42*a*, 43*a*, and 44*a* is actuated whenever a key in the column is depressed. As an example, when key 1 is depressed to the position as shown in FIG. 2, the horizontal length of line 31*a* becomes taut and shortens because the circular opening 34*a* in the key stem forces the line 31*a* downward. However, lines 32*a* and 33*a* remain slack, i.e., in their normal position, since elongated openings 35*a* and 36*a* do not make contact with the respective lines. Therefore, only the lever 41 on switch 42*a* is actuated, and the levers 41 on switches 43*a* and 44*a* are not actuated. Thus, it should now be clear that the switches 42*a*, 43*a*, and 44*a* are actuated or not actuated, in accordance with the code given by the binary truth table shown in FIG. 6, the binary bit "1" indicating that the particular switch is to be actuated when the particular digit key is depressed.

When generating a decimal parity digit, the full keyboard shown in FIG. 1 is only able to handle numbers having up to eight decimal digits, because, as will be more clearly understood from the following description, column *i* is used to generate the parity digit for the number placed into the other eight columns *a* through *h*. If higher order numbers are to be handled, a full keyboard calculating machine with more key columns is required, and the novel features described herein can be readily adapted to full keyboards with more key columns.

Referring again to FIG. 3, the additional features, referred to previously, that are incorporated in the digit keys in column *i*, will now be described. The digit keys 1 through 7 in column *i* differ from the other digit keys in the keyboard, in that buttons 22 are fixed to cylindrical iron key stems 26 (more clearly shown in the enlarged FIG. 5). Each cylindrical iron key stem 26 has a cylindrical rod 50, having non-magnetic properties and made of, for example, plastic. The plastic rod 50 is coaxially fixed at the other end of the iron key stem 26. Each plastic rod 50 contacts a flat key stem 23′ that is very similar to the flat key stem 23 in the keys of the other columns with the exception that the flat key stem 23′ is shorter to provide room for solenoids S1 through S7 under the top plate 48. Flat key stem 23 described in connection with the description of column *a* can be readily converted to the shorter flat key stem 23′ by removing the portion of the key stem 23 above the openings 34*a*, 35*a* and 36*a*. One iron key stem 26 and one plastic rod 50, for each of the digit keys 1 through 7, are disposed within each solenoid coil S1, S2, S3, S4, S5, S6, and S7, respectively. The iron stem 26 protrudes slightly within each solenoid coil so that the solenoid action is enhanced. Since most keyboard calculating machines have hardened steel key stems 23, the plastic rod 50 is used as a magnetic shield and protrudes through the lower end of the solenoids as shown in FIG. 5. This arrangement assures that when the solenoid coil is energized its associated digit key is depressed. However, if the key stems 23′ are made of non-magnetic material, for example, non-magnetic stainless steel, the non-magnetic key stems could be placed closer to the coils without interfering with the solenoid operation. The seven solenoid coils S1 through S7 are suitably supported below top plate 48 by a frame 93. Column *i* also includes lines 31*i*, 32*i*, and 33*i* threaded through openings 34*i*, 35*i*, 36*i* and tied to switches 42*i*, 43*i*, and 44*i*, respectively, although this feature is not required to generate a parity digit, but as will be subsequently described, these elements are used when the apparatus is employed as a parity checking device.

In this specification, elements that perform substantially the same function have been assigned the same numerical reference numerals. However, in order to distinguish the key column in which certain elements, such as the three openings on the key stems 23, the three code lines, and the three switches, are located, the reference numerals of these elements in the same key column are followed by the same letter of the alphabet that is used to identify the key column. As an example, the reference numerals for the elements in key column *a* are followed by letter *a*, the reference numerals for the elements in key column *b* by letter *b*, etc.

*The schematic wiring diagram*

Referring to FIG. 4, a schematic wiring diagram of the relay switches will now be described. Since there are three switches in a group, and one group of switches for each key column, this embodiment includes twenty-seven switches 42*a* to 42*i*, 43*a* to 43*i*, 44*a* to 44*i*, that are preferably double pole, double throw switches, as each switch includes two poles, for example, poles 52*a* and 53*a* in switch 42*a*. The two poles are actuated to be in two positions by the respective lever 41 (shown schematically by the dashed line). When a code line in any of the key columns is slack, the particular double pole, double throw switch mechanically linked to the slack line is held, for example, by a spring (not shown) to the position as shown in the drawing with the poles 52*a* and 53*a* contacting terminals 54*a* and 55*a*, respectively, of switch 42*a*. When a code line is taut, the particular double pole, double throw switch mechanically linked to the taut line is moved to the alternate position, for example, wherein the poles 52*a* and 53*a* make contact with terminals 56*a* and 57*a*, respectively, of switch 42*a*.

The double pole, double throw switches are connected as shown to form a binary odd-even comparator in which the nine switches 42*a* through 42*i*, that represent one binary denominational order, are series connected in such a manner that the ground potential applied to pole 52*i* of switch 42*i* through a normally closed, single pole, single throw switch 58, is coupled to a lead 96 that is connected to both terminals 54*a* and 57*a* of switch 42*a* when an even number of switches in the series is actuated. However, the ground potential is coupled to another lead 97 that is connected to both terminals 55*a* and 56*a* of switch 42*a* when an odd number of switches in the series is actuated. This result is achieved by having the pole 52*a* of switch 42*a* connected to both terminals 54*b* and 57*b* of switch 42*b* and by having pole 53*a* connected to both terminals 55*b* and 56*b* also of switch 42*b*, etc., as shown in the drawing.

The nine switches 43*a* through 43*i*, representing another binary denominational order also achieve the same result but in this series the ground potential, applied to pole 52*i* of switch 43*i* through a normally closed switch 59, is coupled to either lead 98 or lead 99 depending on whether an even or odd number of switches, respectively, in the series is actuated.

The nine switches 44*a* through 44*i*, representing still another binary denominational order, also achieve the same results but in this series the potential of the power supply 60, applied to pole 52*i* of switch 44*i* through three normally closed switches 72, 73, and 95′ and the normally open switch 62, is coupled to either lead 100 or lead 101 depending on whether an even or odd number of switches, respectively, in the series is actuated. Although only twelve switch 42*a*, 42*b*, 42*h*, 42*i*, 43*a*, 43*b*, 43*h*, 43*i*, 44*a*, 44*b*, 44*h*, and 44*i* are shown in FIG. 4, the other fifteen switches are included schematically.

Other connections are made to the twenty-seven switches 42*a* through 42*i*, 43*a* through 43*i*, and 44*a* through 44*i*, for reasons that will become apparent hereinafter. These connections are as follows: In the first series circuit comprised of nine switches 42*a* through 42*i*, the pole 52*i* of switch 42*i* besides being connected to the grounded terminal of a suitable power supply 60 is also connected to the non-grounded terminal of the power supply 60 serially through two normally open switches 61 and 62, and the normally closed switch 95′, each of which is a single pole, single throw switch. At the other end of the first series circuit, terminals 55*a* and 56*a* of switch 42*a* are connected through the lead 97 to one lead of a solenoid coil 63 for a relay switch 64 which is also a double pole, double throw switch. The other end of the solenoid coil 63 is connected to the non-grounded terminal of the power supply 60 through normally closed switches 73 and 95′ and the normally open switch 62.

In the second series circuit comprised of nine switches 43*a* through 43*i*, pole 52*i* of switch 43*i* besides being connected to ground is also connected to lead 96 and, in turn, to terminals 54*a* and 57*a* of switch 42*a* (of the previously mentioned first series circuit) through a normally open switch 66. At the other end of the second series circuit, terminals 55*a* and 56*a* of switch 43*a* are connected by lead 99 to a first pole 67 of relay switch 64, while terminals 54*a* and 57*a* also of switch 43*a* are connected by the lead 98 to a second pole 68 of relay switch 64.

In the third series circuit comprised of nine switches 44*a* through 44*i*, pole 52*i* of switch 44*i* besides being connected to the non-grounded terminal of the power supply 60 is also connected to lead 98 (of the previously mentioned second series circuit) through a normally open switch 71. At the other end of the third series circuit, terminals 55*a* and 56*a* of switch 44*a* are both connected through a lead 101 and a normally closed switch 74 to one lead of each of the four solenoid coils S4, S5, S6, and S7. Terminals 54*a* and 57*a* of switch 44*a* are both connected through the lead 100 and a normally closed switch 75 to one lead of each of the three solenoid coils S1, S2, and S3. The lead 100 is also connected through two normally open switches 81 and 82 to a lead 92′ of the electric motor 92 (FIG. 3) which powers the mechanical movement of the calculating machine. The lead 92′ of the electric motor 92 is also connected to the non-grounded terminal of the power supply 60 serially through a normally closed switch 83 and the normally open switch 82. The other lead of the motor 92 is grounded.

The relay switch 64 forms part of the logic circuit that determines which one of the seven coils S1 through S7 is to be energized. The relay switch 64 has four terminals 77, 78, 79, and 80. Terminals 77 and 79 make contact with poles 67 and 68, respectively, when the solenoid coil 63 is not energized. When the coil 63 is energized, poles 67 and 68 make contact with terminals 78 and 80, respectively. The other lead of both solenoid coils S2 and S6 is connected to terminal 77, the other lead of both solenoid coils S3 and S7 is connected to terminal 78; and the other lead of both solenoid coils S1 and S5 is connected to terminal 80; while the other lead of only coil S4 is connected to terminal 79. A solenoid coil S0 (shown by dotted line and whose function will be later described) would be connected when needed between lead 100 and terminal 79.

It is to be noted that the schematic circuit shown in FIG. 4 allows the calculating machine to operate in three different modes, i.e., the mode that the machine was originally designed to perform, the mode for generating a parity digit, and the mode for checking any number entered on the keyboard for parity. When the machine is to operate in the first mentioned mode the parity bar 95 is in the up position (also the check bar 87 is in the up position to insure that switch 83 is closed) and, in turn, switch 95′ is opened thereby isolating the circuit from the calculating machine. Power is supplied to the motor 92 through switches 83 and 82.

When the machine is to operate in its second mode and as a parity digit generator, the parity bar 95 is depressed and is locked by a suitable finger on enclosure 91 (as shown in the drawing) to keep switch 95′ closed. The check bar 87 stays in the up position, and the eleven switches 72, 74, 81, 75, 71, 59, 66, 58, 61, 73 and 83 (mentioned above and enclosed in enclosure 91) are in the positions as shown in FIG. 4, i.e., switches 58, 59, 72, 73, 74, 75, and 83 are closed and switches 61, 66, 71, and 81 are open.

With parity bar 95 in the depressed position and check bar in the up position, the circuit in order to generate a parity digit operates as follows: the first series circuit of switches *42a* through *42i* makes a choice of which group of four solenoids is to be energized, as this series circuit energizes or does not energize the coil 63 of relay switch 64 depending on whether the number of switches actuated in the first series circuit is odd or even. If the number is odd, the group that is chosen includes the four solenoids S1, S3, S5, and S7. If the number is even, the group that is chosen includes the four solenoids S0, S2, S4, and S6. The second series circuit of switches *43a* through *43i* limits the numerical choice of solenoids made by the first series circuit from four to two solenoids, as the second series circuit determines to which one of two different groupings of the solenoids (the groupings of solenoids now being S0, S1, S4, S5, and S2, S3, S6, S7) the ground potential is to be applied. The ground potential is applied to the first mentioned grouping of solenoids (S0, S1, S4, and S5) when the number of actuated switches in the second series circuits is even, and is applied to the other grouping of solenoids when the number of actuated switches is odd. The third series circuit of switches *44a* through *44i* further limits the numerical choice of solenoids from two to one of the eight solenoids, as the third series circuit determines to which one of two further groupings of solenoids (the groupings of solenoids now being S0, S1, S2, S3 and S4, S5, S6, S7) the non-grounded potential of the power supply is to be applied. The non-grounded potential is applied to the first mentioned grouping of solenoids (S0, S1, S2, and S3) when the number of actuated switches in the third series circuit is even, and is applied to the other grouping of solenoids when the number of actuated switches is odd.

When the machine is to operate in its third mode and as a parity digit checker, the parity bar 95 is again depressed and locked, and also the check bar 87 is depressed and locked. By depressing the check bar the switches 61, 66, 71, and 81 are closed and the switches 58, 59, 72, 73, 74, 75, and 83 are opened (opposite than as shown in the drawing). The eight solenoids S0 through S7 and the relay switch 64 and coil 63 are now electrically isolated from the circuit. Power to the motor 92 is now coupled when the motor bar 21 is depressed, through switches 62, 95′, and 61, and the first series circuit. If the number of actuated switches in the first series circuit is even, power is further coupled to lead 96 and switch 66 to the second series circuit. If the number of actuated switches in the second series circuit is also even, power is further coupled to lead 98 and switch 71 to the third series circuit. If the number of actuated switches in the third series circuit is also even, power is further coupled to lead 100, and switches 81 and 82 to the motor 92. It is understood if any one of the three series circuits has an odd number of actuated switches the circuit to the motor 92 cannot be completed.

To simplify the circuit design of this embodiment, the three switches *42i*, *43i*, and *44i* are made similar to the other switches *42a* through *42h*, *43a* through *43h*, and *44a* through 44h, even though the poles *53i* of each switch *42i*, *43i* and *44i* have nothing connected to them.

*Generating a decimal parity digit for a number*

The operation of the novel mechanism adapted to the keyboard and the circuit shown in FIG. 4 will now be explained. First the parity bar 95 is depressed and locked in position, and the check bar 87 is retained in the up position. As an example, when a number, such as 542,361, is to be set up on the keyboard, the digit key 5 in column *f*, key 4 in column *e*, key 2 in column *d*, key 3 in column *c*, key 6 in column *b*, and key 1 in column *a* are all depressed. The truth table shown in FIG. 6 indicates that the key stem of digit key 1 has its opening *34a* circularly shaped, and, with the digit key 1 in column a depressed, only line *31a* in that column is taut whereby one switch *42a* is actuated and poles *52a* and *53a* in switch *42a* make contact with terminals *56a* and *57a*, respectively. Also, by referring to the truth table, when digit key 6 in column *b* is depressed, lines *32b* and *33b* are taut (remembering that column *a* is representative of the other columns and therefore digit key 6 has its respective openings *35b* and *36b* circularly shaped). Thus, the poles *52b* and *53b* of both switches *43b* and *44b* contact their respective terminals *56b* and *57b*. With digit key 3 in column *c* depressed, lines *31c* and *32c* are taut, whereby poles *52c* and *53c* of both switches *42c* and *43c* (schematically included in FIG. 4) contact their respective terminals *56c* and *57c*. Also, with keys 2, 4, and 5 in columns *d*, *e*, *f*, respectively, depressed, various lines in the respective columns are made taut. In turn, the two poles in each switch *43d*, *44e*, *42f*, and *44f* are actuated to contact their respective terminals 56 and 57 (followed by the proper letter of the alphabet). Since no key is depressed in any of the columns *g*, *h*, and *i*, switches *42g*, *43g*, *44g*, *42h*, *43h*, *44h*, *42i*, *43i*, and *44i* remain in the position shown (FIG. 4). Since switch 62 was open during the time the number 542,361 was being set up on the keyboard, the circuit has the added advantage that no current flowed through any of the twenty-seven switches *42a* through *42i*, *43a* through *43i*, and *44a* through *44i* while they were being actuated, thus preventing arcing between contacts. Thus, the parity digit has not yet been set up in column *i* although the circuits are in condition for doing so as soon as power is supplied upon the depressing of the motor bar 21.

The number is now ready to be printed and it is a result of initiating the printing that power is supplied to the circuits. With the check bar 87 in the up position, as shown, and the parity bar 95 in the down position, the printing operation, in general, is performed by depressing the motor bar 21 (FIG. 1). At this time the switches 62 and 82 are closed as they are linked to the motor bar 21 by a suitable linkage 84 (shown schematically by dotted line in FIG. 4). The switch 82 represents the motor actuating switch of the calculating machine of the prior art. To ensure that switch 62 closes in sufficient time to operate a solenoid-operated digit key, i.e., set up the parity digit so that it can be printed with the number, the linkage between the motor bar 21 can be made to close switch 62 before it closes switch 82. However, generally, solenoids operate many times faster than mechanical linkages and this feature may not be required in some embodiments of the invention. Since three switches *42a*, *42c*, and *42f* (the comparator indicates that an odd number of binary "1" bits are compared) have been actuated in the first series circuit of nine switches *42a* through *42i*, the circuit through coil 63 is completed when switch 62 is closed. The energized coil 63 pulls a suitable armature 85 (schematically shown) to actuate poles 67 and 68 of relay switch 64. Since three switches *43b*, *43c*, and *43d* have been actuated in the second series circuit of nine switches *43a* through *43i*, lead 99 and the pole 67 in switch 64 are both grounded. Then, because three switches *44b*, *44e*, and *44f* in the third series circuit of nine switches *44a* through *44i* have been actuated, the non-grounded potential of the power supply is applied to lead 101 and a circuit through coil S7 is completed. The energized coil S7 pulls the iron stem 26 (FIG. 3) on digit key 7 column *i* down into the keyboard. When the electric motor 92 goes through its printing cycle, the digit 7 is printed along with the number 542,361 and the number "7 542361" appears on the paper 25 with a double space between the "7" and the "5."

As other numbers are set up on the keyboard of the calculating machine, different parity digits are computed by the mechanism when the motor bar 21 is depressed to print the number. As mentioned before depending on which ones of the various twenty-seven switches have been actuated, the circuit of FIG. 4 determines which parity digit is to be printed with the number. As another example, if the number 7,542,361 is set up on the keyboard, the three additional switches *42g*, *43g*, and *44g* in key column *g* are also actuated together with the switches in the other columns, as mentioned above with number 542,361. Now, when motor bar 21 is depressed to print the number, a potential difference is formed between lead 100 and terminal 79 in relay switch 64. The solenoid coil S0 (mentioned above) if used in the mechanism would be connected across the lead 100 and terminal 79. Since the calculating machine preferably, is of the type that prints a significant zero when no key is depressed in a particular significant column, in this embodiment coil S0 is dispensed with. However, if the calculating machine is of the type that requires a digit key to be depressed to enter a zero, a coil S0 would be added to the circuit as described above. Coil S0 can be made to pull another iron key stem which, in turn, actuates a digit key in a manner similar to the manner that the other coils S1 through S7 operate a solenoid and, in turn, a digit key. Since none of the digit keys 1 through 7 are depressed by the solenoids, in this latter example, the number "0 7542361" appears on the paper tape 25 with a single space between the "0" and the "7."

The removable cover 29, mentioned before, prevents the accidental depression of a digit key in the key column *i* during the generation of a parity digit and thus ensures that a correct parity digit is generated. To summarize the above described procedure, if the sum of the binary "1" bits in the binary denominational order represented by switches *42a* through *42i* is even, the circuit through the switches to the relay coil 63 is not completed. However, if the sum of the binary "1" bits is odd, the circuit through relay coil 63 is completed. Then, if the sum of the binary "1" bits in the binary denominational order represented by switches *43a* through *43i* is even, the ground potential is conducted through the series circuit to the lead 98, coupled to pole 68 on relay switch 64. However, if the sum of the binary "1" bits is odd, the ground potential is conducted through the series circuit to lead 99, coupled to pole 67 of the relay switch 64. In the remaining binary denominational order, if the sum of the binary "1" bits is even, the series circuit of switches *44a* through *44i* conducts the potential of the non-grounded terminal of the power supply 69 from pole *52h* of switch *44h* to the lead 100. However, if the sum of the binary "1" bits is odd, the potential is conducted to the lead 101.

*Checking a copied number*

There are many times when an available number having a parity digit is required to be transferred or copied from one data record to another. The circuit shown in FIG. 4 is readily and simply modified to form one embodiment of a parity digit checker. A checking circuit is produced simply by depressing the check bar 87 and maintaining the parity bar 95 in the depressed position. The check bar 87 is locked in the depressed position by a suitable finger in enclosure 91 (FIG. 4). The check bar 87 is linked by a suitable linkage 94′ (shown schematically) to the bank of eleven switches 72, 74, 81, 75, 71, 59, 66, 58, 61, 73, and 83 (mentioned above) so that the switches are actuated together. Seven switches 58, 59, 72, 73, 74, 75, and 83 are closed and four switches 61, 66, 71, and 81 are opened when the check bar 87 is in the up position. When the check bar 87 is depressed, all the poles in the eleven switches 72, 74, 81, 75, 71, 59, 66, 58, 61, 73, and 83 swing downward through the action of the linkage 94 so that the seven switches that were closed are now open and the four switches that were opened are now closed. At the same time the check bar 87 is depressed, the removable cover 29 is also removed to expose the digit keys in key column *i*.

If the number "2 654,621," to be copied already includes its parity digit 2, the number is set up on the keyboard by depressing key 2 in column i, key 6 in column f, key 5 in column g, etc. Again, some of the twenty-seven switches *42a* through *42i*, *43a* through *43i* and *44a* through *44i* are actuated when the number is set up on the keyboard. In particular, the following switches are actuated: *42a*, *42e*, *43b*, *43c*, *43 f*, *43i*, *44c*, *44d*, *44e*, and *44f*. With the switches in this setting arrangement (remembering the check bar 87 is depressed), the circuit to the electric motor 92 is completed when the motor bar 21 closes both switches 62 and 82, and, in turn, the number is printed. None of the eight solenoid coils SO to S7 can be energized when a checking operation is being performed as the coils are disconnected from the circuit by the down position of the check bar 87.

However, if one of the digits was entered incorrectly, for example, the digit 1 (in the number 2 654,621) was erroneously entered as the digit 7 in key column *a*, then, instead of only switch *42a* in key column *a* being actuated, all the switches *42a*, *43a*, and *44a* in key column *a* are actuated (including switches *42e*, *43b*, *43c*, *43f*, *43i*, *44c*, *44d*, *44e*, and *44f*) leaving the circuit to the electric motor 92 open when the motor bar 21 is depressed. Therefore, since the circuit to the motor 92 cannot be closed because the parity digit (2) is not correct for that number (654,627), allowing at least one of the three series circuits to have an odd number of actuated switches, the printing mechanism is in an inoperable state to prevent printing of an incorrectly entered number.

Since three code lines are chosen for each column, in the preferred embodiment of the invention, only eight different decimal parity digits 0 through 7 are available. Therefore, as mentioned above, the openings *34a*, *35a*, and *36a* in keys 8 and 9 of column *a* are made similar to the openings *34a*, *35a*, and *36a* in keys 1 and 6 of column *a*, respectively. This duplication of openings has been chosen because the described embodiment of the invention is used in a particular type of system which uses a stylized font of digits where the probability of mistaking an 8 for a 1, a 9 for a 6, or vice versa is very small or non-existent.

However, in some applications of the invention wherein the probability of mistaking one digit for any other digit is on par for all the digits, then more than three code lines would be required to uniquely define each of the digits so as to obtain the desired reliability in error checking. For example, if four code lines instead of three code lines are used in each column, then four switches would be provided for each key column. Such a system would require two columns of parity digits since sixteen unique parity digit combinations would be generated. Other than the fact that four series circuits instead of three series circuits would be provided for comparing the binary code, these series circuits would operate in a similar manner depending upon whether an odd or even number of switches were switched by the number set up on the keyboard.

With the present disclosure in view, modification of the invention will appear to those skilled in the art. Accordingly, the invention is not limited to the exact details of the illustrated preferred embodiment but includes all such modifications and variations coming within the scope of the invention as defined in the appended claims.

What is claimed is:

1. Apparatus for generating a parity digit for a number set up on a keyboard of a calculating machine, comprising: a plurality of key columns on said keyboard, said keyboard including a parity key column, each of said key columns having a plurality of digit keys; switching means associated with each of said key columns; means for actuating each said switching means in accordance with the digit key depressed in a key column when the number is set up on the keyboard; circuit means for interconnecting the switching means into a series of circuits to provide an output dependent upon whether an odd or an even number of switching means are actuated; and energizing means including means responsive to the output of said circuit means for selectively setting one of the keys in said parity key column corresponding to the parity digit for the number set up on said keyboard.

2. Apparatus for generating a parity digit for a number set up on a keyboard of a calculating machine, comprising: a plurality of key columns on said keyboard, one of said key columns being a parity digit column, each of said key columns having a plurality of digit keys; a group of switches associated with each of said key columns; mechanical means linking the digit keys of each key column with the group of switches associated therewith for actuating the switches in the group of switches in accordance with the digit key depressed in a key column when the number is set up on the keyboard; means for interconnecting corresponding switches in each group of switches to form a plurality of series circuits; solenoid coils provided for the keys in said parity digit column; and circuit means including means responsive to the outputs of said plurality of series circuits for selectively energizing one of said solenoid coils to depress a key in said parity digit column corresponding to the parity digit for the number set up on said keyboard.

3. Apparatus for generating a parity digit for a number entered on a keyboard of a calculating machine, comprising: a plurality of key columns on said keyboard, one of said key columns being a parity digit column, each of said key columns having a plurality of digit keys; a group of switches associated with each of said key columns; means linking the digit keys of each key column with the group of switches associated therewith for actuating the switches in the group of switches in accordance with the digit key depressed in a key column when the number is entered on the keyboard; means for interconnecting corresponding switches in each group of switches to form a plurality of series circuits, each said series circuit providing an output dependent upon whether an odd or even number of the switches included in the series is actuated; solenoid coils provided for the keys in said parity digit column; and circuit means including means responsive to the outputs of said plurality of series circuits for selectively energizing one of said solenoid coils to cause a digit key to be depressed in said parity digit column corresponding to the parity digit for the number entered on said keyboard.

4. Apparatus for generating a parity digit for a number set up on a keyboard of a calculating machine, comprising: a plurality of key columns on said keyboard, one of said key columns being a parity digit column, each of said key columns having a plurality of digit keys; a group of three double pole-double throw switches associated with each of said key columns; mechanical means linking the digit keys of each key column with the group of switches associated therewith for actuating the switches in the group of switches in accordance with a binary code corresponding to the digit key depressed in a key column when the number is set up on the keyboard; means for interconnecting corresponding binary order switches in each group of switches to form three series circuits, each of said series circuits providing an output dependent upon whether an odd or even number of the switches in the series is actuated; solenoid coils provided for the keys in said parity digit column; and circuit means including means responsive to the outputs of said three series circuits for selectively energizing one of said solenoid coils to depress a key in said parity digit column corresponding to the parity digit for the number set up on said keyboard.

5. Apparatus adapted for use in a calculating machine having a plurality of key columns on a keyboard, each of said key columns having a plurality of digit keys, and said calculating machine having a printing mechanism for printing the number set up on the keyboard, said apparatus comprising: a group of switches associated with each of said key columns; mechanical means linking the digit keys of each key column with the group of switches associated therewith for actuating the switches in the group of switches in accordance with the digit key depressed in a key column when a number is set up on the keyboard; said switches being interconnected to form a series circuit to provide an output dependent upon whether an odd or even number of switches in the series are actuated; and circuit means including means responsive to the output of said series circuit for controlling whether the number set up on the key board is to be printed or is not to be printed by the calculating machine.

6. Apparatus for checking whether a correct parity digit is associated with a number entered on a keyboard of a calculating machine, comprising: an electric motor for actuating said calculating machine; a plurality of key columns on said keyboard, one of said key columns being a parity digit column; each of said key columns having a plurality of digit keys; a group of switches associated with each of said key columns; means linking the digit keys of each key column with the group of switches associated therewith for actuating the switches in each of the groups of switches in accordances with the digit key depressed in a key column when the number and its parity digit are set up on the keyboard; means for interconnecting the switches in the groups of switches to form a series circuit; and means connected through said series circuit capable of energizing said motor to transfer the number and its parity digit as set up on said keyboard to an output record medium dependent upon whether an odd or even number of switches in said series circuit is actuated by entering the number and its parity digit on the keyboard.

7. An apparatus for generating a parity digit for a number set up on a keyboard of a calculating machine comprising: a plurality of key columns on said keyboard, one of said key columns being a partity digit column, each of said key columns having a plurality of digit keys; a key stem for each of said digit keys, each said key stem provided with a different combination of circular and elongated openings; a group of switches associated with each of said key columns; a set of code lines for each key column, each line passing through corresponding openings of the key stems for that column, one end of each said code line being fixed and the other end being connected to a switch of the group of switches associated with the key column; said switches being actuated by modifying the length of the code lines in accordance with the shape of the openings in the key stem upon depressing a key in a column; means for interconnecting corresponding switches in each group of switches to form a plurality of series circuits, each said series circuits providing an output dependent upon whether an odd or even number of switches included in the series is actuated; solenoid coils provided for the keys in said parity digit column; and circuit means including means responsive to the outputs of said plurality of series circuits for selectively energizing one of said solenoid coils to depress a key in said parity digit column corresponding to the parity digit for the number set up on said keyboard.

References Cited by the Examiner

UNITED STATES PATENTS

| | | | |
|---|---|---|---|
| 2,684,199 | 7/54 | Starreveld et al. | 235—61.71 |
| 2,684,200 | 7/54 | Starreveld et al. | 235—61 |
| 2,857,100 | 10/58 | Franck et al. | 235—153 |
| 3,049,293 | 8/62 | Garvey et al. | 235—145 |
| 3,105,636 | 10/63 | Greene | 235—60.25 |

LEO SMILOW, *Primary Examiner.*